US007902141B2

(12) United States Patent
Becker et al.

(10) Patent No.: US 7,902,141 B2
(45) Date of Patent: Mar. 8, 2011

(54) POLYMER FOR TREATING SURFACES

(75) Inventors: Heike Becker, Mannheim (DE); Hans-Juergen Degen, Lorsch (DE); Marcus Guzmann, Muehlhausen (DE); Tanja Gass, Frankenthal (DE); Volker Braig, Weinheim-Luetzelsachsen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/587,269

(22) PCT Filed: Jan. 27, 2005

(86) PCT No.: PCT/EP2005/000794

§ 371 (c)(1), (2), (4) Date: Jul. 26, 2006

(87) PCT Pub. No.: WO2005/073357

PCT Pub. Date: Aug. 11, 2005

(65) Prior Publication Data

US 2007/0155646 A1 Jul. 5, 2007

(30) Foreign Application Priority Data

Jan. 30, 2004 (DE) ......................... 10 2004 005 010

(51) Int. Cl.

| | |
|---|---|
| ***C11D 3/37*** | (2006.01) |
| ***B08B 9/20*** | (2006.01) |
| ***B08B 7/00*** | (2006.01) |
| ***C08G 69/08*** | (2006.01) |
| ***C08G 12/00*** | (2006.01) |
| ***C08G 73/00*** | (2006.01) |

(52) U.S. Cl. .......... 510/499; 134/25.2; 134/42; 528/310; 528/229; 528/422

(58) Field of Classification Search .................. 510/499, 510/238, 326, 409, 517; 134/25.2, 42; 528/229, 528/310, 422

See application file for complete search history.

(56) References Cited

U.S. PATENT DOCUMENTS

| | | | | |
|---|---|---|---|---|
| 2,407,895 | A | 9/1946 | Monson et al. | |
| 3,686,128 | A | 8/1972 | Werdehausen et al. | |
| 3,963,806 | A | 6/1976 | Dornte | |
| 4,144,123 | A | 3/1979 | Scharf et al. | |
| 4,404,362 | A | 9/1983 | Bellos | |
| 4,459,220 | A | 7/1984 | Bellos | |
| 5,641,855 | A * | 6/1997 | Scherr et al. | 528/310 |
| 6,573,228 | B1 * | 6/2003 | Littig et al. | 510/302 |
| 6,653,274 | B1 | 11/2003 | Godfroid et al. | |
| 6,777,530 | B1 * | 8/2004 | Meixner et al. | 528/422 |
| 2003/0195135 | A1 * | 10/2003 | Boeckh et al. | 510/475 |
| 2003/0216272 | A1 * | 11/2003 | Sherry et al. | 510/295 |

FOREIGN PATENT DOCUMENTS

| | | |
|---|---|---|
| DE | 24 56 638 | 6/1975 |
| DE | 29 16 356 | 11/1980 |
| DE | 40 28 285 | 3/1992 |
| DE | 42 44 194 | 6/1994 |
| DE | 198 59 777 | 6/2000 |
| DE | 102 35 089 | 2/2004 |
| EP | 0 025 515 | 3/1981 |
| JP | 48-20203 | 6/1973 |
| JP | 2-92852 | 4/1990 |
| WO | 96 04358 | 2/1996 |
| WO | 97 42285 | 11/1997 |
| WO | 98 17764 | 4/1998 |
| WO | 00 49126 | 8/2000 |

* cited by examiner

*Primary Examiner* — Milton I Cano
*Assistant Examiner* — Thuy-Ai N Nguyen
(74) *Attorney, Agent, or Firm* — Oblon, Spivak. McClelland, Maier & Neustadt, L.L.P.

(57) ABSTRACT

The present invention relates to compositions for treating hard surfaces, comprising a water-soluble or water-dispersible compound as component A which is obtainable by reacting: aa) polyalkylenepolyamines, polyamidoamines, polyamidoamines grafted with ethyleneimine, polyether-amines and mixtures of said compounds, as component Aa; ab) if appropriate at least bifunctional crosslinkers which have, as functional group, a halogenhydrin, glycidyl, aziridine or isocyanate unit or a halogen atom, as component Ab; and ac) monoethylenically unsaturated carboxylic acids, salts, esters, amides or nitriles of monoethylenically unsaturated carboxylic acids, chlorocarboxylic acids and/or glycidyl compounds, such as glycidyl acid, glycidylamide or glycidyl esters; and water; to a process for the preparation of a water-soluble or water-dispersible compound, to water-soluble or water-dispersible compounds preparable by the process according to the invention, and to the use of water-soluble or water-dispersible compounds according to the present application in compositions for treating hard surfaces.

10 Claims, No Drawings

POLYMER FOR TREATING SURFACES

This application is a national stage of international application PCT/EP05/00794 which claims foreign priority under 35 USC 119(a-d) to German application 10 2004 005 010.4.

The present invention relates to compositions for treating hard surfaces, comprising a water-soluble or water-dispersible compound and water, to a process for the preparation of a water-soluble or water-dispersible compound, to water-soluble or water-dispersible compounds preparable by the process according to the invention, and to the use of water-soluble or water-dispersible compounds according to the present application in compositions for treating hard surfaces for rapid and streak-free drying, ease of soil release, reduction in or prevention of the condensation of water and/or the formation of dried-on traces of water on the hard surfaces.

For the cleaning of hard surfaces, in particular of smooth surfaces such as glass or ceramic, besides a high cleaning performance, simple and comfortable application, and streak-free and rapid drying, it is desirable for water to run off from the cleaned surfaces in the form of a thin film of water so that the formation of dried-on traces of water on these surfaces is avoided. Furthermore, easier soil release, e.g. of lime residues, is desired. Wetting with water on the hard surfaces takes place, for example, in the bathroom during and after showering or bathing, where the formation of dried-on traces of water can also be observed. These traces of water arise in particular due to the water hardness in the form of traces of lime and lime edges. In the bathroom, and also in other areas, e.g. in areas with floor coverings which form hard surfaces, rapid and streak-free drying is further desired. For the automatic washing or handwash too, many of the abovementioned properties are desired. Furthermore, the formation of dried-on water drops is a problem when cleaning window glass, for example when the cleaned window is then subject to a rain shower.

It is desirable to provide compositions for the treatment of hard surfaces which are suitable for equipping hard surfaces with one or more of the abovementioned properties for a period of more than one wetting cycle.

WO 96/04358 discloses glass cleaning compositions which avoid a troublesome degree of film formation and/or streaking and thus impart a desirable appearance to the glass surface. This desirable appearance is maintained over a prolonged period, which is achieved by the glass cleaners comprising a material which imparts greater hydrophilicity to the glass. This material is preferably polycarboxylates, for example poly(vinylpyrrolidone/acrylic acid), polyacrylic acid or sulfonated polystyrene polymers.

DE-A 198 59 777 relates to aqueous liquid surfactant-containing cleaners for hard surfaces, in particular glass, which comprise lignin sulfonate. The lignin sulfonate in the cleaning compositions at the same time achieves a so-called antirain effect (avoidance of dried-on traces of water) and an antimisting effect (avoidance of the condensation of water on the hard surfaces).

Compared with the compositions for treating hard surfaces which are known from the prior art, it is desirable to further improve the properties of the compositions for treating hard surfaces, in particular for smooth surfaces such as glass, metal, ceramic or plastic, i.e. to provide compositions which have a desirable combination of the abovementioned properties, where at least some of these properties are retained over a period of more than one wetting cycle.

We have found that this object is achieved by compositions for treating hard surfaces comprising at least one water-soluble or water-dispersible compound as component A which is obtainable by reacting
- aa) polyalkylenepolyamines, polyamidoamines, polyamidoamines grafted with ethyleneimine, polyether-amines and mixtures of said compounds, as component Aa,
- ab) if appropriate at least bifunctional crosslinkers which have, as functional group, a halogenhydrin, glycidyl, aziridine or isocyanate unit or a halogen atom, as component Ab, and
- ac) monoethylenically unsaturated carboxylic acids, salts, esters, amides or nitriles of monoethylenically unsaturated carboxylic acids, chlorocarboxylic acids and/or glycidyl compounds, such as glycidyl acid, glycidylamide or glycidyl esters;

and
water.

It has surprisingly been found that compositions which comprise said water-soluble or water-dispersible compounds have excellent properties with regard to rapid and streak-free drying, avoidance or reduction of the condensation of water, the formation of dried-on traces of water, in particular due to water hardness in the form of traces of lime and lime edges on hard surfaces, and easier soil release, in particular lime release.

Hard surfaces are understood as meaning all known hard surfaces. These are, in particular, smooth surfaces, for example surfaces made of glass, ceramic, metal, e.g. stainless steel, enamel, painted surfaces and plastic.

Treatment is understood as meaning either a pre- or after-treatment of the hard surfaces before or after cleaning, or else treatment during cleaning. Furthermore, the treatment of the hard surfaces can take place independently of a cleaning operation.

Polymers which are obtainable by reacting components Aa, if appropriate Ab and Ac are already known from the prior art.

For example, DE-A 42 44 194 relates to water-soluble condensation products of compounds containing amino groups and crosslinkers. These condensation products are products obtainable by reacting
- a) polyalkylenepolyamines, polyamidoamines, polyamidoamines grafted with ethyleneimine, polyether-amines, and mixtures of said compounds,
- b) monoethylenically unsaturated carboxylic acids, salts, esters, amides or nitriles of monoethylenically unsaturated carboxylic acids, chlorocarboxylic acids and/or glycidyl compounds, such as glycidyl acid, glycidylamide or glycidyl esters, and
- c) at least bifunctional crosslinkers which have, as functional group, a halohydrin, glycidyl, aziridine or isocyanate unit or a halogen atom.

These water-soluble condensation products are used as dewatering, flocculation and retention agents in papermaking. The use of the water-soluble condensation products in compositions for treating hard surfaces is not disclosed in DE-A 42 44 194.

WO 97/42285 relates to soil release polymers for cotton which have water-soluble or water-dispersible modified polyamine compounds. According to the description, the modified polyamines are preferably polyethyleneimines and polyethyleneamines which have a low molecular weight, generally below 600 daltons, and which are joined together via “oxy” units. The use of the polymers disclosed in WO 97/42285 in cleaners for hard surfaces is not disclosed in WO 97/42285.

WO 00/49126 relates to detergent compositions which have at least one modified polyamine compound and a surfactant. The modified polyamine compound is a grafted or ungrafted, modified or unmodified polyamine which is crosslinked. The polyamine used in one embodiment is polyethyleneimine. Crosslinkers which can be used are amide-forming crosslinkers and further crosslinkers, for example epihalohydrins or epihalohydrins in combination with, for example, polyethylene glycol. The modification of the polyamine compounds takes place by grafting, for example with aziridine, or by so-called "capping" by reaction with monocarboxylic acids which have a $C_1$-$C_{22}$-alkyl radical which is linear or branched. Polyamine compounds which have been reacted with unsaturated carboxylic acids are not disclosed in WO 00/49126. Neither does WO 00/49126 disclose the use of the modified polyamine compounds in cleaners for hard surfaces.

The water-soluble or water-dispersible compounds (component A) used according to the invention can be used simply on their own, as a single component in aqueous solution, in the composition for treating hard surfaces. In a further embodiment of the present application, besides the water-soluble or water-dispersible compounds (component A), the composition comprises at least one surfactant as component B. Compositions which comprise at least one surfactant (component B) besides the at least one water-soluble or water-dispersible compound (component A) are suitable, besides the treatment of hard surfaces, for achieving the desired abovementioned properties at the same time as cleaning these surfaces.

Besides the water-soluble or water-dispersible compound (component A) and the at least one surfactant (component B), the composition can comprise further components which are customarily used in cleaners for hard surfaces.

Particular preference is given to compositions comprising a) at least one water-soluble or water-dispersible compound according to the present application as component A;
b) at least one surfactant chosen from the group consisting of anionic, nonionic, amphoteric and cationic surfactants, as component B;
c) if appropriate at least one water-soluble organic solvent, as component C;
d) if appropriate ammonia and/or at least one alkanolamine, as component D;
e) if appropriate at least one inorganic acid, carboxylic acid and/or sulfonic acid, as component E;
f) if appropriate at least one builder, as component F;
g) if appropriate further auxiliaries and additives, as component G; and
h) water.

Component A is generally present in the composition according to the invention in an amount of from 0.01 to 40% by weight, preferably 0.05 to 20% by weight, particularly preferably 0.1 to 5% by weight. Components B to F are generally present in the composition according to the invention in amounts known to the person skilled in the art.

Particular preference is given to a composition comprising a) 0.01 to 40% by weight, preferably 0.05 to 20% by weight, particularly preferably 0.1 to 5% by weight, of component A;
b) 0.01 to 80% by weight, preferably 0.01 to 30% by weight, particularly preferably 0.01 to 20% by weight, very particularly preferably 0.01 to 5% by weight, of component B;
c) 0 to 50% by weight, preferably 0.1 to 30% by weight, particularly preferably 0.5 to 15% by weight, very particularly preferably 1 to 10% by weight, of component C;
d) 0 to 5% by weight, preferably 0.01 to 3% by weight, particularly preferably 0.02 to 1% by weight, very particularly preferably 0.05 to 0.5% by weight, of component D;
e) 0 to 5% by weight, preferably 0.01 to 3% by weight, particularly preferably 0.02 to 1% by weight, very particularly preferably 0.05 to 0.5% by weight, of component E;
f) 0 to 10% by weight, preferably 0.1 to 5% by weight, particularly preferably 0.1 to 3% by weight, of component F;
g) 0 to 5% by weight, preferably 0.01 to 3% by weight, of component G;
h) and water as the remainder;

where the total amount of components A to G and water is 100% by weight.

The abovementioned amounts relate to ready-to-use compositions. Ready-to-use compositions are understood as meaning aqueous solutions which are applied to the surface in a manner typical of the surface, e.g by wiping, spraying or rinsing or similar methods as are customarily used for the treatment of objects with hard surfaces. However, the present invention also relates to concentrates, i.e. compositions comprising the abovementioned components A to G, but no water or less water than stated above, which means that components A to G are present in higher concentrations. The concentrations of components A to G in the presence of no or little water as stated above can be ascertained easily by the person skilled in the art on the basis of the abovementioned amounts. The present application further relates to compositions comprising components A to G which are in powder, granule, paste or gel form. Corresponding auxiliaries and additives, and also processes for the preparation of the composition according to the invention in the various forms are known to the person skilled in the art.

The effects of rapid and streak-free drying, prevention of or reduction in the condensation of water and/or the formation of dried-on traces of water on the hard surfaces and/or easier soil release which are achieved using the compositions according to the invention generally last over a prolonged period and more than one rewetting cycle. As a result, the cleaning, for example soil release, in cleaning operations is easier following treatment with the composition according to the invention. This is achieved by the surface of the hard surfaces being modified (hydrophilized) for a prolonged period. This achieves improved water run-off behavior and at the same time lower soil and salt deposition on the hard surfaces.

Component A

Component A is obtained by reacting the components Aa, if appropriate Ab and Ac. The water-soluble or water-dispersible compound can thus be present in crosslinked or uncrosslinked form, where component Aa has in any case been modified with component Ac.

In this connection, the components Aa, if appropriate Ab and Ac can be used in any ratios to one another. If component Ab is used, components Aa and Ab are preferably used in a molar ratio of from 100:1 to 1:1000, particularly preferably 20:1 to 1:20. The molar ratio between components Aa and Ac is preferably chosen such that the molar of the hydrogen atoms on the nitrogen in Aa to the component Ac is 1:0.2 to 1:0.95, preferably 1:0.3 to 1:0.9, particularly preferably 1:0.4 to 1:0.85.

Component Aa

Polyalkylenepolyamines can be used as component Aa. According to the present application, polyalkylenepolyamines should be understood as meaning compounds which contain at least 3 nitrogen atoms, for example diethylenetriamine, triethylenetetramine, tetraethylenepentamine, pentaethylenehexamine, diaminopropyleneethylenediamine, trisaminopropylamine and polyethyleneimines. The polyethyleneimines preferably have an average molar mass ($M_w$) of at least 300. The average molar mass of the polyethyleneimines is preferably from 800 to 2 000 000, particularly preferably 20 000 to 1 000 000, very particularly preferably 20 000 to 750 000, determined by light scattering.

The polyalkylenepolyamines can be partially amidated. Products of this type are prepared, for example, by reacting polyalkylenepolyamines with carboxylic acids, carboxylic esters, carboxylic anhydrides or carboxylic acid halides. According to the present application, the polyalkylenepolyamines are preferably 1 to 30% amidated, particularly preferably up to 20% amidated, for the subsequent reactions.

It is necessary that the amidated polyalkylenepolyamines also have free NH groups so that they can be reacted with the compounds Ab and Ac. Suitable carboxylic acids for the amidation of the polyalkylenepolyamines are $C_1$-$C_{28}$-carboxylic acids, for example formic acid, acetic acid, propionic acid, benzoic acid, lauric acid, palmitic acid, stearic acid, oleic acid, linoleic acid and behenic acid. It is likewise possible for the amidation to be carried out by reacting the polyalkylenepolyamines with alkyldiketene.

Furthermore, the polyalkyleneamines can be used partially in quaternized form as component Aa. Suitable quaternizing agents are, for example, alkylhalides, such as methyl chloride, ethyl chloride, butyl chloride, epichlorohydrin, hexyl chloride, dimethyl sulfate, diethyl sulfate and benzyl chloride. If quaternized polyalkylenepolyamines are used as component Aa, the degree of quaternization is preferably 1 to 30%, particularly preferably up to 20%.

Furthermore, polyamidoamines are suitable as component Aa. The polyamidoamines are obtainable, for example, by reacting $C_4$-$C_{10}$-dicarboxylic acids with polyalkylenepolyamines which preferably contain 3 to 10 basic nitrogen atoms in the molecule. Suitable dicarboxylic acids are, for example, succinic acid, maleic acid, adipic acid, glutaric acid, suberic acid, sebacic acid or terephthalic acid. It is also possible to use mixtures of carboxylic acids, for example mixtures of adipic acid and glutaric acid or maleic acid and adipic acid. Preference is given to using adipic acid for the preparation of the polyamidoamines. Suitable polyalkylenepolyamines which are condensed with the dicarboxylic acids have already been specified above, for example diethylenetriamine, triethylenetetramine, dipropylenetriamine, tripropylenetetramine, dihexamethylenetriamine, aminopropylethylenediamine and bis-aminopropylethylenediamine are suitable. The polyalkylenepolyamines can also be used in the form of mixtures for the preparation of the polyamidoamines. The preparation of the polyamidoamines preferably takes place without a diluent, but can also, where appropriate, be carried out in inert solvents. The condensation of the dicarboxylic acids with the polyalkylenepolyamines takes place at elevated temperatures, for example in the range from 120 to 220° C. The water formed during the reaction is distilled off from the reaction mixture. The condensation can, where appropriate, be carried out in the presence of lactones or lactams of carboxylic acids having 4 to 8 carbon atoms. Per mole of dicarboxylic acid, 0.8 to 1.4 mol of a polyalkylenepolyamines are generally used. The polyamidoamines obtainable in this way have primary and secondary NH groups and are soluble in water.

Furthermore, polyamidoamines grafted with ethyleneimine can be used as component Aa. Products of this type can be prepared by allowing ethyleneimine to act upon the above-described polyamidoamines in the presence of Bronstedt acids or Lewis acids, for example sulfuric acid, phosphoric acid or boron trifluoride etherate. Under the conditions stated, ethyleneimine is grafted onto the polyamidoamine. For example, per basic nitrogen group in the polyamidoamine, 1 to 10 ethyleneimine units, graft on, i.e. approximately 10 to 500 parts by weight of ethyleneimine are used per 100 parts by weight of a polyamidoamine.

Furthermore, polyether-amines can be used as component Aa. Compounds of this type are known, for example, from DE-A 29 16 356. The polyether-amines can be obtained by condensing di- and polyamines with chlorohydrin ethers at elevated temperatures. The polyamines can contain up to 10 nitrogen atoms. The chlorohydrin ethers are prepared, for example, by reacting dihyric alcohols with 2 to 5 carbon atoms, the alkoxylation products of these alcohols with up to 60 alkylene oxide units, glycerol or polyglycerol, which comprises up to 15 glycerol units, erythritol or pentaerythritol with epichlorohydrin. Per mole of one of said alcohols, 2 to 8 mol of epichlorohydrin are used. The reaction of the di- and polyamines with the chlorohydrin ethers is usually carried out at temperatures of from 1 to 200° C., preferably 110° C. to 200° C. Furthermore, polyether-polyamines can be prepared by condensing diethanolamine or triethanolamine by known processes, as are disclosed, for example, in U.S. Pat. Nos. 4,404,362, 4,459,220 and 2,407,895.

As component Aa, preference is given to using polyalkylene-polyamines which are if appropriate amidated up to at most 20%. Particular preference is given to using polyalkylene-polyamines, in particular polyethyleneimines, which very particularly preferably have a molar mass of from 800 to 2 000 000, particularly preferably 20 000 to 1 000 000, very particularly preferably 20 000 to 750 000.

Component Ab

Suitable as component Ab are at least bifunctional crosslinkers which have a halohydrin, glycidyl, aziridine or isocyanate unit or a halogen atom as functional groups.

Suitable crosslinkers are, for example, epihalohydrins, preferably epichlorohydrin, and α,ω-bis(chlorohydrin) polyalkylene glycol ethers and the α,ω-bis(epoxides) of polyalkylene glycol ethers obtainable therefrom by treatment with bases. The chlorohydrin ethers are prepared, for example, by reacting polyalkylene glycols in the molar ratio 1 to at least 2 to 5 with epichlorohydrin. Suitable polyalkylene glycols are, for example, polyethylene glycol, polypropylene glycol and polybutylene glycols, and block copolymers of $C_2$- to $C_4$-alkylene oxides. The average molar masses ($M_w$) of the polyalkylene glycols are generally 100 to 6000, preferably 300 to 2000 g/mol. α,ω-Bis(chlorohydrin) polyalkylene glycol ethers are described, for example, in U.S. Pat. No. 4,144,123. As is likewise disclosed therein, the corresponding bisglycidyl ethers of the polyalkylene glycols are produced from the dichlorohydrin ethers by treatment with bases.

Also suitable as crosslinkers are α,ω-dichloropolyalkylene glycols, as are disclosed, for example, in EP-A 0 025 515. These α,ω-dichloropolyalkylene glycols are obtainable by reacting di- to tetrahydric alcohols, preferably alkoxylated di- to tetrahydric alcohols, either with thionyl chloride with elimination of HCl and subsequent catalytic decomposition of the chlorosulfonated compounds with the elimination of sulfur dioxide, or converted with phosgene with the elimination of HCl into the corresponding bischlorocarbonic esters and from this then obtaining α,ω-dichloroethers by catalytic decomposition with the elimination of carbon dioxide.

The di to tetrahydric alcohols are preferably ethoxylated and/or propoxylated glycols which are reacted with 1 to 100, in particular 4 to 40, mol of ethylene oxide per mole of glycol.

Further suitable crosslinkers are α,ω- or vicinal dichloroalkanes, for example 1,2-dichloroethane, 1,2-dichloropropane, 1,3-dichloropropane, 1,4-dichlorobutane and 1,6-dichlorohexane. Further suitable crosslinkers are the reaction products of at least trihydric alcohols with epichlorohydrin to give reaction products which have at least two chlorohydrin units. For example, the polyhydric alcohols used are glycerol, ethoxylated or propoxylated glycerols, polyglycerols having 2 to 15 glycerol units in the molecule, and if appropriate ethoxylated and/or propoxylated polyglycerols. Crosslinkers of this type are known, for example, from DE-A 29 16 356. Further suitable are crosslinkers which contain blocked isocyanate groups, for example trimethylhexamethylene diisocyanate blocked with 2,2,3,6-tetramethylpiperidinone-4. These crosslinkers are known, for example, from DE-A 40 28 285. Further suitable are crosslinkers containing aziridine units and based on polyethers or substituted hydrocarbons, for example 1,6-bis-N-aziridinohexane. According to the present application, the crosslinkers can be used individually or as mixtures of two or more crosslinkers.

As component Ab, particular preference is given to using epihalohydrins, preferably epichlorohydrin, α,ω-bis(chlorohydrin) polyalkylene glycol ethers, α,ω-bis(epoxides) of the polyalkylene glycol ethers and/or bisglycidyl ethers of the polyalkylene glycols.

Component Ac

Suitable as component Ac are monoethylenically unsaturated carboxylic acids which preferably have 3 to 18 carbon atoms in the alkenyl radical. Suitable monoethylenically unsaturated carboxylic acids are acrylic acid, methacrylic acid, dimethacrylic acid, ethylacrylic acid, allylacetic acid, vinylacetic acid, maleic acid, fumaric acid, ethaconic acid, methylenemalonic acid, citraconic acid, oleic acid and linolenic acid. Preference is given to the monoethylenically unsaturated carboxylic acids chosen from the group consisting of acrylic acid, methacrylic acid and maleic acid.

Also suitable are the salts of the abovementioned monoethylenically unsaturated carboxylic acids as component Ac. Suitable salts are generally the alkali metal, alkaline earth metal and ammonium salts of the abovementioned acids. Preference is given to the sodium, potassium and ammonium salts. The ammonium salts can be derived either from ammonia or from amines or amine derivatives, such as ethanolamine, diethanolamine and triethanolamine. Suitable alkaline earth metal salts are generally magnesium and calcium salts of the abovementioned monoethylenically unsaturated carboxylic acids.

Suitable esters of the abovementioned monoethylenically unsaturated carboxylic acids are derived from monohydric $C_1$-$C_{20}$-alcohols or dihydric $C_2$-$C_6$-alcohols. Suitable esters are, for example, methyl acrylate, ethyl acrylate, n-propyl acrylate, isopropyl acrylate, n-butyl acrylate, isobutyl acrylate, methyl methacrylate, ethyl methacrylate, isopropyl methacrylate, n-butyl methacrylate, 2-ethylhexyl acrylate, 2-ethylhexyl methacrylate, palmityl acrylate, lauryl acrylate, diaryl acrylate, lauryl methacrylate, palmityl methacrylate, stearyl methacrylate, dimethyl maleate, diethyl maleate, isopropyl maleate, 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, hydroxybutyl acrylate, hydroxybutyl methacrylate and hydroxyhexyl acrylate and methacrylate.

Suitable amides of monoethylenically unsaturated carboxylic acids are, for example, acrylamide, methacrylamide and oleamide. Suitable nitriles of the monoethylenically unsaturated carboxylic acids are preferably acrylonitrile and methacrylonitrile. Furthermore, suitable amides are understood as meaning the reaction products of the monoethylenically unsaturated carboxylic acids, in particular of (meth) acrylic acid, with amidoalkanesulfonic acids. Particularly suitable amides which are obtainable by reacting monoethylenically unsaturated carboxylic acids, in particular of (meth) acrylic acid, with amidoalkanesulfonic acids are compounds of the formulae I or II $$H_2C{=}CH{-}X{-}SO_3H \quad (I)$$

$$H_2C{=}C(CH_3){-}X{-}SO_3H \quad (II)$$

in which X is either not present or is a spacer group of the formulae $-C(O)-NH-CH_{2-n}(CH_3)_n(CH_2)_m-$, $-C(O)NH-$, $-C(O)-NH-(CH(CH_3)CH_2-$, or $-C(O)-NH-CH(CH_2CH_3)-$, in which n is 0 to 2 and m is 0 to 3. Particular preference is given to 1-acrylamido-1-propanesulfonic acid ($X{=}-C(O)-NH-CH(CH_2CH_3)-$ in formula I), 2-acrylamido-1-propanesulfonic acid ($X{=}-C(O)-NH-CH(CH_3)CH_2-$ in formula I), 2-acrylamido-2-methyl-1-propanesulfonic acid ($X{=}-C(O)-NH-C(CH_3)_2CH_2-)-$ in formula I), 2-methacrylamido-2-methyl-1-propanesulfonic acid ($X{=}-C(O)-NH-C(CH_3)_2CH_2-)-$ in formula II) and vinylsulfonic acid (X not present in formula I).

Chlorocarboxylic acids are also suitable as component Ac. Suitable chlorocarboxylic acids are, for example, chloroacetic acid, 2-chloropropionic acid, 2-chlorobutyric acid, dichloroacetic acid and 2,2'-dichloropropionic acid.

Also suitable as component Ac are glycidyl compounds which have the following formula:

(III)

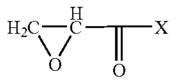

in which:

X is $NH_2$, OMe, OR

Me is H, Na, K, ammonium and

R is $C_1$-$C_4$-alkyl or $C_2$-$C_4$-hydroxyalkyl.

Preferred compounds of the formula III are glycidyl acid, its sodium, potassium, ammonium, magnesium or calcium salts, glycidyl amide and glycidyl esters such as glycidyl methyl ester, glycidyl ethyl ester, glycidyl n-propyl ester, glycidyl n-butyl ester, glycidyl isobutyl ester, glycidyl 2-ethylhexyl ester, glycidyl 2-hydroxypropyl ester and glycidyl 4-hydroxybutyl ester. Particular preference is given to glycidyl acid, its sodium, potassium or ammonium salts or glycidyl amide.

As component Ac, preference is given to using a monoethylenically unsaturated carboxylic acid, particularly preferably acrylic acid, methacrylic acid or maleic acid, very particularly preferably acrylic acid.

The water-soluble or water-dispersible compounds (component A) can be produced by processes according to the prior art. Suitable preparation processes are disclosed, for example, in DE-A 42 44 194, in which component Aa is firstly reacted with component Ac and only then is component Ab added. Furthermore, according to DE-A 42 44 194, it is possible to react components Ac and Ab simultaneously with component Aa.

In a preferred embodiment, the water-soluble or water-dispersible compounds (component A) comprising the components Aa, Ab and Ac are prepared by a process comprising the steps:

i) crosslinking of polyalkylenepolyamines, polyamidoamines, polyamidoamines grafted with ethyleneimine, polyether-amines, and mixtures of said compounds as component Aa, with at least bifunctional crosslinkers which have, as functional group, a halogenhydrin, glycidyl, aziridine or isocyanate unit or a halogen atom, as component Ab;

and ii) reaction of the product obtained in step i) with monoethylenically unsaturated carboxylic acids, salts, esters, amides or nitriles of monoethylenically unsaturated carboxylic acids, chlorocarboxylic acids and/or glycidyl compounds, such as glycidyl acid, glycidylamide or glycidyl esters, as component C.

This reaction according to the invention differs from the reactions disclosed in DE-A 42 44 194 by virtue of the fact that the order of the reaction has been changed, such that firstly a crosslinking of the compounds of component Aa with crosslinkers of component Ab is undertaken, and only then does a reaction of the resulting product with compounds of component Ac take place Step i)

The crosslinking of the compounds of component Aa with crosslinkers of component Ac takes place by processes known to the person skilled in the art. In general, the crosslinking takes place at a temperature of from 10 to 200° C., preferably 30 to 100° C. The reaction is usually carried out at atmospheric pressure. The reaction times are dependent on the components Aa and Ab used. The reaction time is generally 0.5 to 20 hours, preferably 1 to 10 hours. The crosslinker (component Ab) is generally added in aqueous solution, meaning that the reaction usually takes place in aqueous solution. The product obtained can be isolated or be reacted directly—without isolation step—in step ii), which is preferred.

Step ii)

In step ii), the reaction of the product obtained in step i) with those compounds of group Ac which contain a monoethylenically unsaturated double bond takes place by a type of Michael addition, while chlorocarboxylic acids and glycidyl compounds of the formula I react via the chloro group or the epoxide group with the primary or secondary amino groups of the crosslinked product obtained in step i). The reaction generally takes place at temperatures of from 10 to 200° C., preferably 30 to 100° C. The reaction is usually carried out at atmospheric pressure. The reaction time is dependent on the components used. In general, the reaction time is 0.5 to 100 hours, preferably 1 to 50 hours.

The reaction is usually carried out in aqueous solution, the product obtained in step i) already being present in aqueous solution.

The components Aa, Ab and Ac used in the process according to the invention have already been defined above.

The present application further provides water-soluble or water-dispersible compounds preparable by the process according to the invention of the present application comprising steps i) and ii).

Besides component A and water, the compositions according to the invention can comprise further components B to G.

Component B

The compositions according to the invention comprise 0.01 to 80% by weight, preferably 0.01 to 30% by weight, particularly preferably 0.01 to 20% by weight, very particularly preferably 0.01 to 5% by weight, of at least one surfactant, chosen from the group consisting of anionic, nonionic, amphoteric and cationic surfactants, as component B.

Suitable anionic surfactants are, for example, fatty alcohol sulfates of fatty alcohols having 8 to 22, preferably 8 to 18 carbon atoms, e.g. $C_9$-$C_{11}$-alcohol sulfates, $C_{12}$-$C_{13}$-alcohol sulfates, $C_{14}$-$C_{18}$-alcohol sulfates, such as lauryl sulfate, cetyl sulfate, myristyl sulfate, palmityl sulfate, stearyl sulfate or tallow fatty alcohol sulfate.

Further suitable anionic surfactants are sulfated ethoxylated $C_8$-$C_{22}$-alcohols (alkyl ether sulfates) and soluble salts thereof. Compounds of this type are prepared, for example, by firstly alkoxylating a $C_{8-22}$, preferably $C_{10-18}$-alcohol, e.g. a fatty alcohol, and then sulfating the alkoxylation product. For the alkoxylation, preference is given to using ethylene oxide, using 2 to 50, preferably 2 to 30, mol of ethylene oxide per mole of fatty alcohol. The alkoxylation of the alcohols may, however, also be carried out with propylene oxide on its own and if appropriate butylene oxide. Also suitable are those alkoxylated $C_{8-22}$-alcohols which contain ethylene oxide and propylene oxide or ethylene oxide and butylene oxide. The alkoxylated $C_{8-22}$-alcohols may contain the ethylene oxide, propylene oxide and butylene oxide units in the form of blocks or in random distribution.

Further suitable anionic surfactants are alkanesulfonates such as $C_8$-$C_{24}$, preferably $C_{10}$-$C_{18}$-alkanesulfonates, and soaps, such as the Na and K salts of $C_8$-$C_{24}$-carboxylic acids.

Further suitable anionic surfactants are $C_8$-$C_{20}$-linear alkylbenzenesulfonates (LAS), preferably linear $C_9$-$C_{13}$-alkylbenzenesulfonates and -alkyltoluenesulfonates.

Further suitable anionic surfactants are $C_8$-$C_{24}$-olefinsulfonates and -disulfonates, which may also represent mixtures of alkene- and hydroxyalkanesulfonates or -disulfonates, alkyl ester sulfonates, sulfonated polycarboxylic acids, alkyl glycerol sulfonates, fatty acid glycerol ester sulfonates, alkylphenol polyglycerol ether sulfates, paraffinsulfonates having 20 to 50 carbon atoms (based on paraffin or paraffin mixtures obtained from natural sources), alkyl phosphates, acyl isethionates, acyl taurates, acyl methyltaurates, alkylsuccinic acids, alkenylsuccinic acids or half-esters or half-amides thereof, alkylsulfosuccinic acids or amides thereof, mono- and diesters of sulfosuccinic acids, acyl sarcosinates, sulfated alkyl polyglycosides, alkyl polyglycol carboxylates, and hydroxyalkyl sarcosinates.

Suitable anionic surfactants are also alkyl phosphates.

The anionic surfactants are added to the composition according to the invention preferably in the form of salts. Suitable salts are alkali metal salts, such as sodium, potassium, lithium salts and ammonium salts, such as hydroxyethylammonium, di(hydroxyethyl)ammonium and tri(hydroxyethyl)ammonium salts.

The anionic surfactants may be used individually or in combination of different anionic surfactants, and in a mixture with the other specified surfactants. It is possible to use anionic surfactants from only one class, e.g. only fatty alcohol sulfates or only alkylbenzenesulfonates, or else mixtures of different classes, e.g. a mixture of fatty alcohol sulfates and alkylbenzenesulfonates.

Preferred anionic surfactants are alkyl ether sulfates, alkyl sulfates and alkyl phosphates.

Suitable nonionic surfactants are, for example, alkoxylated $C_8$-$C_{22}$-alcohols, such as fatty alcohol alkoxylates or oxo alcohol alkoxylates. The alkoxylation can be carried out with ethylene oxide, propylene oxide, and/or butylene oxide. Surfactants which can be used here are all alkoxylated alcohols which contain at least two added molecules of an abovementioned alkylene oxide. Also suitable here are block copolymers of ethylene oxide, butylene oxide and/or propylene oxide, or addition products which contain said alkylene oxides in random distribution. 2 to 50 mol, preferably 3 to 20 mol, of at least one alkylene oxide is used per mole of alcohol. Preference is given to using ethylene oxide as alkylene oxide. The alcohols preferably have 10 to 18 carbon atoms.

A further class of suitable nonionic surfactants are alkylphenol ethoxylates with $C_6$-$C_{14}$-alkyl chains and 5 to 30 mol of ethylene oxide units.

A further class of nonionic surfactants are alkyl polyglucosides having 8 to 22, preferably 10 to 18, carbon atoms in the alkyl chain. These compounds mostly contain 1 to 20, preferably 1.1 to 5, glucoside units. A further class of nonionic surfactants are N-alkylglucamides.

Suitable nonionic surfactants are also alkylamine alkoxylates or alkylamide ethoxylates.

Preferably, the compositions according to the invention comprise $C_{10}$-$C_{16}$-alcohols ethoxylated with 3 to 12 mol of ethylene oxide, particularly preferably ethoxylated fatty alcohols. Preference is also given to alkyl polyglucosides, alkylamine alkoxylates and amide ethoxylates.

It is possible to use individual nonionic surfactants or a combination of different nonionic surfactants or a mixture with further specified surfactants. Preference is given to using alkoxylated $C_8$-$C_{22}$-alcohols on their own.

Typical examples of amphoteric surfactants are alkylbetaines, alkylamidobetaines, aminopropionates, aminoglycinates or amphoteric imidazolium compounds. Preferred examples are cocoamphocarboxypropionate, cocoamidocarboxypropionic acid, cocoamphocarboxyglycinate and cocoamphoacetate.

Suitable cationic surfactants are substituted or unsubstituted, straight-chain or branched quaternary ammonium salts, e.g. $C_{8-6}$-dialkyldimethylammonium halides, dialkoxydimethylammonium halides or imidazolium salts with a long-chain alkyl radical.

As component B, very particular preference is given to using anionic surfactants, nonionic surfactants or combinations of anionic and nonionic surfactants. Very particular preference is given to component B chosen from fatty alcohol sulfates, alkyl ether sulfates, fatty alcohol alkoxylates and mixtures thereof.

Component C

The water-soluble organic solvent (component C) is generally used in an amount of from 0 to 50% by weight, preferably 0.1 to 30% by weight, particularly preferably 0.5 to 15% by weight, very particularly preferably 1 to 10% by weight, in the compositions according to the invention.

Suitable water-soluble organic solvents are $C_1$-$C_6$-alcohols and/or ether alcohols, preference being given to mixtures of different alcohols and/or ether alcohols.

Suitable alcohols are glycerol, propylene glycol, ethylene glycol, ethanol, isopropanol and n-propanol. Suitable ether alcohols are ether alcohols having up to 10 carbon atoms in the molecule, for example ethylene glycol monobutyl ether, propylene glycol monobutyl ether, diethylene glycol monobutyl ether, propylene glycol monotert-butyl ether and propylene glycol monoethyl ether. Particular preference is given to ethylene glycol monobutyl ether and propylene glycol monobutyl ether. The component C is very particularly preferably chosen from ethanol, isopropanol, n-propanol, ethylene glycol monobutyl ethers, propylene glycol monobutyl ethers and mixtures of two or more of said water-soluble organic solvents.

If alcohol and ether alcohol are used in a mixture, then the weight ratio of alcohol and ether alcohol is preferably 1:2 to 4:1. In mixtures of two different ether alcohols, preferably ethylene glycol monobutyl ether and propylene glycol monobutyl ether, the weight ratio is preferably 1:6 to 6:1, particularly preferably 1:5 to 5:1, very particularly preferably 4:1, where particularly preferably the fraction of the ether alcohol having fewer carbon atoms is the higher of the two.

Components D and E

Ammonia and/or at least one alkanolamine (component D) or at least one inorganic acid, carboxylic acid and/or sulfonic acid (component E) are in each case used in an amount of, in general, 0 to 5% by weight, preferably 0.01 to 3% by weight, particularly preferably 0.02 to 1% by weight, very particularly preferably 0.05 to 0.5% by weight.

As component D, preference is given to using ammonia and/or alkanolamines which contain 1 to 9 carbon atoms in the molecule. As alkanolamines, preference is given to using ethanolamines, particularly preferably monoethanolamine.

Besides the ammonia and/or the at least one alkanolamine, the composition according to the invention can additionally comprise at least one inorganic acid, carboxylic acid or sulfonic acid, where the molar ratio of ammonia and/or alkanolamine to carboxylic acid is preferably 1:0.9 to 1:0.1. Suitable carboxylic acids are carboxylic acids which contain 1 to 6 carbon atoms, which may be mono-, di- or polycarboxylic acids. Examples of suitable carboxylic acids are formic acid, acetic acid, glycolic acid, lactic acid, citric acid, succinic acid and adipic acid, preferably formic acid, acetic acid, citric acid and lactic acid, very particularly preferably acetic acid. Examples of suitable sulfonic acids are amidosulfonic acid and methanesulfonic acid, preferably amidosulfonic acid. Examples of suitable inorganic acids are hydrochloric acid and phosphoric acid.

Component F

The at least one builder is used in an amount of, in general, 0 to 10% by weight, preferably 0.1 to 5% by weight, particularly preferably 0.1 to 3% by weight.

The builders include inorganic builders and organic (co) builders.

Suitable inorganic builders are all customary inorganic builders, such as aluminosilicates, silicates, carbonates, phosphates and phosphonates.

Suitable inorganic builders are known to the person skilled in the art and disclosed, for example, in DE-A 101 60 993.

The (co)builders used are, for example, low molecular weight polycarboxylates. Also suitable are salts of phosphonic acids and oligomeric or polymeric polycarboxylates. Also suitable are co- and terpolymers of unsaturated $C_4$-$C_8$-dicarboxylic acids with monoethylenically unsaturated monomers which may additionally be modified, and also polyglyoxylic acids, polyamidocarboxylic acids and modified polyamidocarboxylic acids, polyaspartic acid or cocondensates of aspartic acid with further amino acids, $C_4$-$C_{25}$-mono- or -dicarboxylic acids and/or $C_4$-$C_{25}$-mono- or -diamines, condensation products of citric acid with hydroxycarboxylic acids or polyhydroxy compounds with molar masses of, in general, up to 10 000, preferably up to 5000.

Suitable organic (co)builders are specified, for example, in DE-A 101 60 993.

Furthermore, besides components A to F, the compositions according to the invention can comprise further auxiliaries and additives as component G.

Component G

The further auxiliaries and additives may be present in an amount of from 0 to 5% by weight, preferably 0.01 to 3% by weight, in the composition according to the invention.

Suitable auxiliaries and additives include all auxiliaries and additives customarily used in treatments and cleaners for hard surfaces, preferably dyes, perfume oils, pH regulators, for example citric acid, alkanolamines or NaOH, preservatives, complexing agents for alkaline earth metal ions, enzymes, bleach systems, soil release polymers, foam boosters, foam suppressors or foam inhibitors, biocides, antitarnish and/or anticorrosion agents, suspension agents, fillers, inorganic extenders, disinfectants, hydrotropic compounds, antioxidants, solubility promoters, dispersants, processing auxiliaries, solubilizers, plasticizers and antistatic substances.

Suitable auxiliaries and additives are specified, for example, in DE-A 101 60 993.

The compositions according to the invention are generally prepared by mixing components A to G if they are present in the composition according to the invention, and water.

The compositions can, for example, be used as pre- or after-treatment compositions for hard surfaces, in particular glass and ceramic, or cleaners such as glass cleaners, floor cleaners, all-purpose cleaners, bath cleaners, rinse aids, dishwashing detergents for hand or machine dishwashing, machine cleaners, metal degreasers, high-pressure cleaners, alkaline cleaners, acidic cleaners, point degreasers, dairy cleaners etc. Preferably, the compositions are used as pre- or after-treatment compositions for hard surfaces, in particular glass and ceramic, or cleaners such as glass cleaners, floor cleaners, all-purpose cleaners and bath cleaners.

The present application further provides a process for the treatment of hard surfaces, where the hard surfaces are brought into contact with the composition according to the invention.

Suitable compositions and hard surfaces have already been specified above. The "bringing into contact" generally takes place by rinsing, spraying or wiping or other methods known to the person skilled in the art. The "bringing into contact" can take place as a pre- or after-treatment before or after cleaning, during cleaning or independently of a cleaning operation.

The invention further provides the use of the water-soluble or water-dispersible compounds (component A) according to the present application for treating hard surfaces for rapid and streak-free drying, ease of soil release, reduction or avoidance of the condensation of water and/or the formation of dried-on traces of water on the hard surfaces. Preferred water-soluble or water-dispersible compounds and surfaces have already been specified above. The compounds can be used, for example, in pre- or after-treatment compositions for hard surfaces, in particular glass and ceramic, or cleaners such as glass cleaners, floor cleaners, all-purpose cleaners, bath cleaners, rinse aids, dishwashing detergents for hand or machine dishwashing, machine cleaners, metal degreasers, high-pressure cleaners, alkaline cleaners, acidic cleaners, point degreasers, dairy cleaners etc. Preferably, the water-soluble or water-dispersible compounds are used in pre- or after-treatment compositions for hard surfaces, in particular glass and ceramic or cleaners such as glass cleaners, floor cleaners, all-purpose cleaners and bath cleaners.

The present application further provides the use of the compositions according to the invention for treating hard surfaces for rapid and streak-free drying, ease of soil release, reduction or avoidance of the condensation of water and/or the formation of dried-on traces of water on the hard surfaces. Preferred compositions and surfaces have already been specified above. Preferably, the compositions are used in pre- or after-treatment compositions for hard surfaces, in particular glass and ceramic or cleaners such as glass cleaners, floor cleaners, all-purpose cleaners and bath cleaners.

EXAMPLES

Preparation Examples

Preparation Example 1

Polymer 1—Crosslinking of Polyethyleneimine and Subsequent Michael Addition with Acrylic Acid 196 g of polyethyleneamine (anhydrous, Mw=25 000 g/mol, Lupasol® WF) are placed, under a nitrogen atmosphere, in a four-neck flask with metal stirrer and reflux condenser and diluted to 25% with 588 g of demineralized water. The mixture is heated to 70° C. with stirring and, at this temperature, 40 ml of a 22% strength aqueous solution of a crosslinker are added quickly. The crosslinker is a reaction product of a polyethylene glycol with an average molar mass of 1500 with epichlorohydrin. When the addition is complete, the mixture is stirred for 5 hours at 70° C. It is then heated to 80° C. and, at this temperature, 263.2 g of acrylic acid are added dropwise over the course of 3 hours. When the addition is complete, the solution is stirred for a further 1 hour at 80° C. Cooling gives a viscous, yellow-orange solution of the product with a solids content of 42% (2 h, vacuum/120° C.) and a K value (1% in water) of 17.

Preparation Example 2

Polymer 2—Reaction of Polyethyleneimine in a Michael Addition with Acrylic Acid 350 g of polyethyleneamine (56% strength, Mw=25 000 g/mol, Lupasol® HF) are placed, under a nitrogen atmosphere, in a four-neck flask with metal stirrer and reflux condenser and diluted to 24% with 456 g of demineralized water. The mixture is heated to below 80° C. and, at this temperature, 259.4 g of acrylic acid are added dropwise over the course of 3 hours. When the addition is complete, the solution is stirred for a further 6 hours at 80° C. Cooling gives a viscous, yellow-orange solution of the product with a solids content of 43.2% (2 h, vacuum/120° C.) and a K value (1% in water) of 14.9.

Preparation Example 3

Polymer 3—Crosslinking of Polyethyleneimine and Subsequent Michael Addition with Acrylic Acid 350 g of polyethyleneamine (56% strength, Mw=25 000 g/mol, Lupasol® HF) are placed, under a nitrogen atmosphere, in a four-neck flask with metal stirrer and reflux condenser and diluted with 456 g of demineralized water. The mixture is heated to 70° C. with stirring and, at this temperature, 18 ml of 50% strength aqueous solution of a crosslinker are added quickly. The crosslinker is a reaction product of a polyethylene glycol with an average molar mass of 660 with epichlorohydrin. When the addition is complete, the mixture is stirred for 5 hours at 70° C. The reaction solution is then heated to 80° C. and, at this temperature, 259.4 g of acrylic acid are added dropwise over the course of 3 hours. When the addition is complete, the solution is stirred for a further hour at 95° C. Cooling gives a viscous, yellow-orange solution of the product with a solids content of 44.1% (2 h, vacuum/120° C.) and a K value (1% in water) of 23.1.

Preparation Example 4

Polymer 4—Crosslinking of Polyethyleneimine and Subsequent Michael Addition with AMPS 350 g of polyethyleneamine (56% strength, Mw=25 000 g/mol, Lupasol® HF) are placed, under a nitrogen atmosphere, in a four-neck flask with metal stirrer and reflux condenser and diluted with 434 g of demineralized water. The mixture is heated to 55° C. with stirring and, at this temperature, 40 ml of a 22% strength aqueous solution of a crosslinker are added quickly. The crosslinker is a reaction product of a polyethylene glycol with an average molar mass of 1500 with epichlorohydrin. When the addition is complete, the mixture is stirred for 1 hour at 70° C.

203 g of the mixture are then admixed with 0.19 g of hydroquinone, heated to 80° C. and, at this temperature, 186.5 g of AMPS in 560 g of water are added dropwise over the course of 3 hours. When the addition is complete, the solution is stirred for a further 48 hours at 80° C. Cooling gives a viscous, yellow-orange solution of the product with a solids content of 25.5% (2 h, vacuum/120° C.) and a K value (1% in water) of 22.9.

Preparation Example 5

Polymer 5—Michael Addition of Partially Crosslinked Polyethyleneimine with Vinylsulfonic Acid 406 g of the only partially crosslinked mixture from Polymer Example 4 are heated to 80° C. and, at this temperature, 936.7 g of vinylsulfonic acid Na salt (25% strength in water, Tamol® VS) are added dropwise over the course of 3 hours. When the addition is complete, the solution is stirred for a further 48 hours at 80° C. Cooling gives a viscous, yellow-orange solution of the product with a solids content of 34.7% (2 h, vacuum/120° C.) and a K value (1% in water) of 22.3.

The K value in accordance with Fikentscher is a measure of the molecular weight of the polymer and is determined in accordance with H. Fikentscher, Cellulose-Chemie 13, 38 to 64 and 71 to 74 (1932) as a 1% strength by weight solution in water.

Application Example

Application Example A 0.5% strength solutions in water of each of the Polymers 1 to 5 are prepared. In the comparison, the standard commercial bath cleaner (biff®) and the same bath cleaner with the addition of 0.5% of the polymer from Preparation Example 1 are used.

For the experiments, Novoker ceramic tiles are used. Firstly, the contact angles of the tiles are measured. In each case 0.3 g of the polymer solution is placed on a tile and wiped uniformly across the surface using a cloth for 30 seconds. The tiles are then left lying to dry.

The tiles are then positioned vertically and sprayed in ten spurts with about 10.5 g of drinking water (hardness 10.4° German hardness). The appearance of the water film is assessed (see Table 1). The tiles are then left standing for 15 minutes in the fume cupboard to dry. Here, the time required for complete drying is monitored (see Table 2). The appearance of the tiles after drying is likewise assessed (Table 3). Finally, the contact angle is determined again (Table 4). The entire procedure (spraying/drying) is repeated 5 times. For comparison, an untreated tile is likewise sprayed, evaluated and measured.

TABLE 1

| Appearance of the water film | | | | |
|---|---|---|---|---|
| Polymer | After 1st cycle | After 2nd cycle | After 3rd cycle | After 5th cycle |
| Without | Runs off in streaks, drops | Runs off in streaks, drops | Runs off in streaks, drops | Runs off in streaks, drops |
| 1 | continuous film | continuous film | ½ continuous at the top, streaky at the bottom | ⅓ continuous at the top, streaky at the bottom |
| 2 | continuous film | continuous film | ½ continuous at the top, streaky at the bottom | ⅓ continuous at the top, streaky at the bottom |
| 3 | continuous film | continuous film | Continuous film, tears open in the middle | Runs off in streaks, drops |
| 4 | Continuous film, tears open at the top | Streaky at the top, continuous at the bottom | Streaky at the top, continuous at the bottom | |
| 5 | Continuous film | Continuous film, tears open in the middle | Runs off in streaks, drops | |
| Bath cleaner | Continuous film | Continuous film | Upper half continuous, streaky at the bottom, drops | Upper half continuous, streaky at the bottom, drops |
| Bath cleaner + polymer 1 | Continuous film | Continuous film | Continuous film | Upper half continuous, streaky at the bottom, drops |

TABLE 2

| Drying time (min) | | | | |
|---|---|---|---|---|
| EVD | After 1st cycle | After 2nd cycle | After 3rd cycle | After 5th cycle |
| Without | 10-15 | 10-15 | >15 | >15 |
| 1 | <5 | 5-10 | 10-15 | >15 |
| 2 | 5-10 | 5-10 | >15 | >15 |
| 3 | 5-10 | 5-10 | 5-10 | 10-15 |
| 4 | 5-10 | 5-10 | 5-10 | >15 |
| 5 | 5-10 | 10-15 | 10-15 | >15 |
| Bath cleaner | 5-10 | 5-10 | 5-10 | >15 |
| Bath cleaner + polymer 1 | 5-10 | 5-10 | 5-10 | 10-15 |

TABLE 3

| Appearance after drying | | | | |
|---|---|---|---|---|
| EVD | After 1st cycle | After 2nd cycle | After 3rd cycle | After 5th cycle |
| Without | Considerable water marks | Considerable water marks | Considerable water marks | Considerable water marks |
| 1 | Not visible | Not visible | Lower half water marks | Lower ⅔ water marks |
| 2 | Not visible | Not visible | Lower half water marks | Lower ⅔ water marks |
| 3 | Not visible | Not visible | Very slight smearing | Slight water marks |
| 4 | Slight water marks | Slight water marks | Slight smearing | |
| 5 | Not visible | Not visible | Very slight smearing | Slight water marks |
| Bath cleaner | Smearing | Not visible | Slight water marks and smearing | Water marks and smearing |
| Bath cleaner + polymer 1 | Slight smearing | Not visible | Not visible | Slight water marks and smearing |

TABLE 4

| Contact angle after drying | | | | | | |
|---|---|---|---|---|---|---|
| EVD | Uncoated | After coating | After 1st cycle | After 2nd cycle | After 3rd cycle | After 5th cycle |
| 1 | 20.9 | 10.5 | 11.8 | 14.6 | 23.9 | 29.8 |
| 2 | 24.0 | 11.3 | 14.8 | 21.4 | 31 | 30 |
| 3 | 19.9 | 9.4 | 9.7 | 13.4 | 19.8 | 26.0 |
| 4 | 17.3 | 14.8 | 23.4 | 21.8 | 22.2 | |
| 5 | 22.1 | 2.8 | 13.9 | 24.3 | 24.2 | |
| Bath cleaner | 26.2 | 1.7 | 1.9 | 19.3 | 26.3 | 28.5 |
| Bath cleaner + polymer 1 | 28.1 | 1.8 | 1.7 | 18.4 | 20.7 | 27.7 |

Application Examples B

Soil Release

1% strength solutions in water are prepared from each of the polymers. In addition, a commercially available bath cleaner (biff®) and this bath cleaner with 1% added polymer are analyzed. The experiments are carried out on mirror glass tiles measuring 15×15 cm. In each case 0.3 g of the polymer solutions is placed onto a tile and wiped uniformly across the surface using a cloth for 30 seconds. The tiles are then left lying to dry. All of the solutions are easy to apply. The solutions comprising bath cleaner leave behind slight marks, the aqueous polymer solutions are invisible after drying. An untreated tile serves as comparison.

The tiles are positioned vertically and sprayed with two spurts (about 0.4 g) of a 2.2% strength sodium oleate solution and then with one spurt (about 0.2 g) of a 0.2 molar $CaCl_2$ solution. During this, lime soap can be seen forming on the surface.

The tiles are then gently inclined and rinsed with 150 ml of drinking water (hardness 10.4° German hardness) (stream from glass water bottle passed evenly along the upper edge of the tile).

The tiles are then laid to dry and finally visually assessed (Table 5). Here 0=completely clean surface, 1=smearing, 2=slight soil deposition at the edge, 3=entire surface with slight soil deposition, 4=heavy visible soil deposition with the greatest accumulation being at the edge, 5=completely covered with considerable soil deposition.

TABLE 5

| Evaluation of the soil release | |
|---|---|
| Polymer | Evaluation |
| Without | 5 |
| 1 | 0.5 |
| 3 | 2 |
| 4 | 5 |
| 5 | 5 |
| Bath cleaner | 2 |
| Bath cleaner + polymer 1 | 0.5 |

Application Example C

Antimisting 0.3 g of a 1% strength polymer solution (Polymer 1) is placed on a mirror tile (15×15 cm) and wiped uniformly across the surface using a cloth for 30 sec. This tile is then placed in the refrigerator (5° C.) together with an untreated tile.

After 4 h, the tiles are removed from the refrigerator. Upon doing so, only the untreated tile mists while the treated tile remains clear.

We claim:

1. A composition for treating hard surfaces consisting of a) at least one water-soluble or water-dispersible compound as component A, which is prepared by aa) crosslinking a compound selected from the group consisting of polyalkylenepolyamines, polyamidoamines grafted with ethyleneimine, polyetheramines and mixtures of said compounds, as component Aa, ab) with a compound selected from the group consisting of bifunctional crosslinkers having, as a functional group, a halogenhydrin, glycidyl, aziridine or isocyanate unit or a halogen atom, as component Ab, thereby forming a crosslinked reaction product, and ac) reacting, by a Michael addition reaction at a temperature of from 30 to 100 ° C., the crosslinked reaction product with, as component Ac, a monoethylenically unsaturated carboxylic acid selected from the group consisting of acrylic acid, methacrylic acid, ethylacrylic acid, salts, esters, amides or nitriles of monoethylenically unsaturated carboxylic acids, and mixtures thereof;

b) at least one surfactant selected from the group consisting of anionic, nonionic, amphoteric and cationic surfactants, as component B;

c) optionally at least one water-soluble organic solvent, as component C;

d) optionally ammonia, alkanolamine or both ammonia and alkanolamine, as component D;

e) optionally at least one acid selected from the group consisting of inorganic acid, carboxylic acid and sulfonic acid, as component E;

f) optionally at least one builder, as component F;

g) optionally auxiliaries and additives, as component G; and h) water.

2. The composition according to claim 1, consisting of a) 0.01 to 40% by weight, of component A;

b) 0.01 to 80% by weight, of component B;

c) 0 to 50% by weight, of component C;

d) 0 to 5% by weight, of component D;

e) 0 to 5% by weight, of component E;

f) 0 to 10% by weight, of component F;

g) 0 to 5% by weight, of component G; and h) water, so that the total amount of components A to G and water is 100% by weight.

3. The composition according to claim 1, wherein component Aa is a polyalkyleneamine.

4. The composition according to claim 1, wherein the component Ab is selected from the group consisting of epihalohydrin, α,ω-bis-(chlorohydrin) polyalkylene glycol ether, α,ω-bis(epoxide) of polyalkylene glycol ether, and bis-glycidyl ether or mixtures thereof.

5. The composition according to claim 1, wherein component B is selected from the group consisting of fatty alcohol sulfates, alkyl ether sulfates, fatty alcohol alkoxylates and mixtures thereof.

6. The composition according to claim 1, wherein component C is present and is selected from the group consisting of glycerol, propylene glycol, ethylene glycol, ethanol, isopropanol, n-propanol, ethylene glycol monobutyl ethers, propylene glycol monobutyl ethers and mixtures thereof.

7. The composition according to claim 1, wherein component D) is present and is ammonia, monoethanolamine or both ammonia and monoethanolamine, component E is present and is selected from the group consisting of formic acid, acetic acid, citric acid, lactic acid and amidosulfonic acid or both component D and E.

8. A process for treating hard surfaces, comprising bringing the hard surfaces into contact with a composition consisting of a) at least one water-soluble or water-dispersible compound as component A, which is prepared by
   aa) crosslinking a compound selected from the group consisting of polyalkylenepolyamines, polyamidoamines grafted with ethyleneimine, polyetheramines and mixtures of said compounds, as component Aa,
   ab) with a compound selected from the group consisting of bifunctional crosslinkers having, as a functional group, a halogenhydrin, glycidyl, aziridine or isocyanate unit or a halogen atom, as component Ab, thereby forming a crosslinked reaction product, and
   ac) reacting, by a Michael addition reaction at a temperature of from 30 to 100° C., the crosslinked reaction product with a monoethylenically unsaturated carboxylic acid selected from the group consisting of acrylic acid, methacrylic acid, ethylacrylic acid, salts, esters, amides or nitriles of monoethylenically unsaturated carboxylic acids, and mixtures thereof;

b) at least one surfactant selected from the group consisting of anionic, nonionic, amphoteric and cationic surfactants, as component B;

c) optionally at least one water-soluble organic solvent, as component C;

d) optionally ammonia, alkanolamine or both ammonia and alkanolamine, as component D;

e) optionally at least one acid selected from the group consisting of inorganic acid, carboxylic acid and sulfonic acid, as component E;

f) optionally at least one builder, as component F;

g) optionally auxiliaries and additives, as component G; and h) water.

9. The process according to claim 8, wherein the composition is selected from the group consisting of glass cleaners, floor cleaners, all-purpose cleaners, bath cleaners, rinse aids, dishwashing detergents for hand or machine dishwashing, machine cleaners, paint degreasers and dairy cleaners.

10. A process for the treatment of hard surfaces for rapid and streak-free drying, ease of soil release, reduction in or prevention of the condensation of water and the formation of dried-on traces of water on the hard surfaces, comprising the step of bringing the hard surfaces into contact with at least one water-soluble or water-dispersible compound which is prepared by aa) crosslinking a compound selected from the group consisting of polyalkylenepolyamines, polyamidoamines grafted with ethyleneimine, polyetheramines and mixtures of said compounds, as component Aa,
   ab) with a compound selected from the group consisting of bifunctional crosslinkers having, as a functional group, a halogenhydrin, glycidyl, aziridine or isocyanate unit or a halogen atom, as component Ab, thereby forming a crosslinked reaction product, and
   ac) reacting, by a Michael addition reaction at a temperature of from 30 to 100° C., the crosslinked reaction product with a monoethylenically unsaturated carboxylic acid selected from the group consisting of acrylic acid, methacrylic acid, ethylacrylic acid, salts, esters, amides or nitriles of monoethylenically unsaturated carboxylic acids, and mixtures thereof.

* * * * *